May 4, 1965        T. COY        3,181,405
DIE STRUCTURE
Filed Aug. 23, 1963
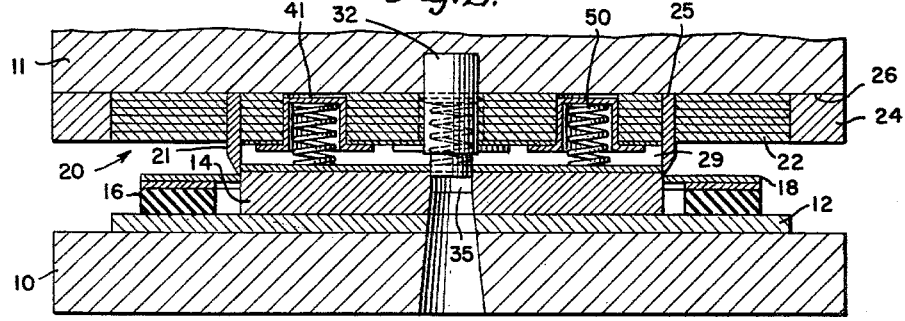
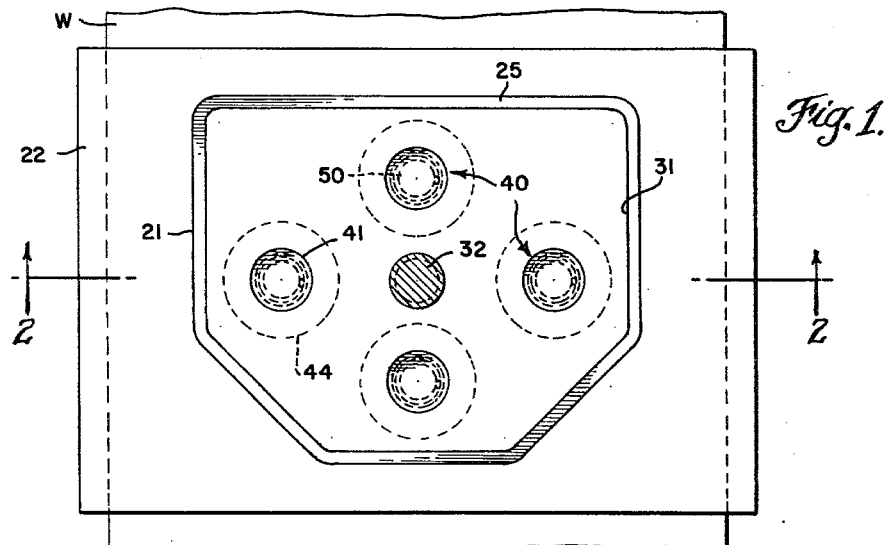
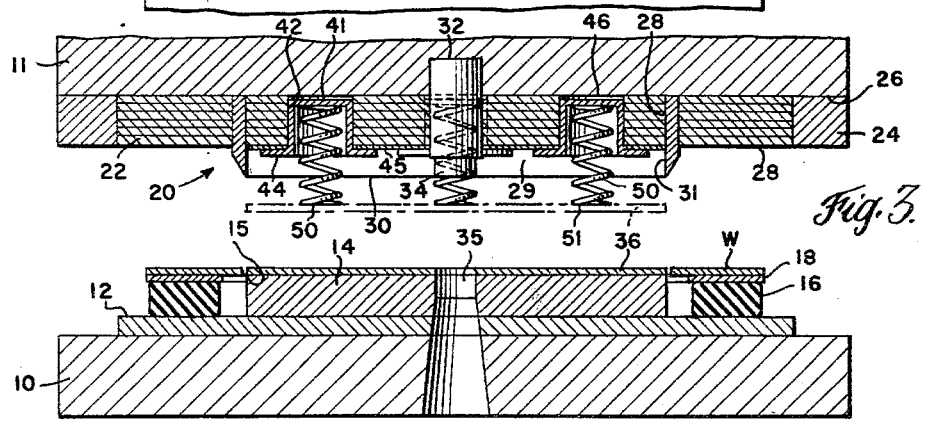
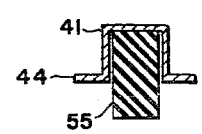
INVENTOR
TRUMAN COY United States Patent Office 3,181,405
Patented May 4, 1965

3,181,405
DIE STRUCTURE
Truman Coy, New Holland, Pa., assignor to Sperry Rand Corporation, New Holland, Pa., a corporation of Delaware
Filed Aug. 23, 1963, Ser. No. 304,160
8 Claims. (Cl. 83—123)

This invention relates generally to die sets and more particularly to rule die set constructions.

Conventionally, a rule die set has a base on which a male die is rigidly mounted. A female die is provided on a ram and cooperative with the male die on each working stroke of the ram to blank a piece from metal sheet stock. The female die is in the form of a rule embedded in plywood which engages and holds the rule along its side walls. The upper end of the rule abuts against the bottom of the ram to directly receive the working force, the wood blocks being used for a die supporting function. The lower or cutting edge of the rule projects downwardly and beyond the bottom surface of the wood. Within the rule and in the space between the inside wall of the rule and between the surface of the wood and the cutting edge of the rule is a stripping element, usually a resilient elastomer material such as hard rubber. With each working stroke of the ram, the rubber is compressed between the metal work piece and the surface of the wood as the rule passes through the metal. When the ram retracts, the rubber expands and such expansion serves to strip the blanked piece from the rule and from any punches which may have been provided along with the rule.

With such construction, providing sufficient stripping force involves problems, particularly when the metal being blanked is of considerable thickness. If a large piece of stripping rubber is employed which completely fills the space inside the rule, the compression forces of the confined rubber are directed not only to the surface of the wood but against the inside wall of the rule. The lateral forces against the rule are transmitted to the wood and tend to rupture it. Further, each time the rubber expands to strip the blanked piece, there are forces directed against the rule tending to pull it outwardly of the ram and the supporting blocks. If the wood is ruptured and the rule becomes loose, the die structure is rendered inoperable and has to be reconstructed.

Rupturing the wood may be avoided by using stripper rubber pieces which occupy only a portion of the space within the projecting portion of the rule die and so related to the die that the rubber does not engage the inside of the rule. However, with this approach the volume of rubber is reduced and providing adequate stripping forces becomes a problem. Generally, the rubber must be of a hard, tough variety which will generate substantial stripping forces. However, such rubber is susceptible to breakdown if subjected to repeated and extensive compression forces. In one installation, while blanking a work piece of ten gauge sheet material, it was found that the deflection of the rubber stripper was thirty-five percent of its thickness. Repeated deflections of this magnitude cause breakdown of the rubber and necessitates early replacement.

A main object of this invention is to provide a rule die construction wherein the problem of pulling the rule die from its supporting wood is wholly eliminated and at the same time fully adequate stripping forces are provided.

Another object of this invention is to provide an improved rule die construction wherein the stripping forces are desirably related and distributed to the die supporting structure, the rule of the die being protected against forces developed during compression of the stripping elements.

Another object of this invention is to provide a rule die construction wherein large stripping forces are achieved in a small area.

Another object of this invention is to provide a rule die construction wherein downward stripping forces on a workpiece result in upward holding forces on the wood holding the die rule.

A still further object of this invention is to provide a rule die construction having a stripping arrangement which is simply designed and low in cost.

Other objects of this invention will be apparent hereinafter from the specification and from the recital in the appended claims.

In the drawing:

FIG. 1 is a plan view of a die constructed according to this invention;

FIG. 2 is a vertical section through the die and showing the press ram at the end of a working stroke with a female die carried thereon in blanking relation to a male die carried on the press bed; the strippers units for freeing a blanked piece from the female die are shown compressed;

FIG. 3 is a view similar to FIG. 2, but showing the ram elevated and the strippers expanded; and FIG. 4 is a vertical section of a stripper unit constructed according to another embodiment of this invention.

Referring now to the drawing by numerals of reference, 10 denotes the bed and 11 the ram of a press. Ram 11 is reciprocal between the upper retracted position shown in FIG. 3 and the lower working position shown in FIG. 2. Bed 10 has a platen 12 which supports a male die 14 having a peripheral shearing edge 15. Surrounding the male die is a resilient pad 16 having a top ring 18 which, along with die 14, supports a sheet metal workpiece W.

Ram 11 carries a female die 20 comprising a steel rule 21 supported by a wood block 22, commonly constructed of plywood. Rule 21 has a shape conforming to the piece to be blanked as shown in FIG. 1 and matching the periphery of male die 14. Block 22 is connected to the ram by conventional means, not shown, and surrounded by a compressing ring 24 which forces the wood into tight holding engagement with rule 21. At its upper end 25, rule 21 directly engages the lower face 26 of the ram. The lower end of the rule projects below the bottom surface 28 of block 22 and forms a surrounded space 29.

Rule 21 has a cutting edge 30 along the inside wall 31 of the rule. Located within the area defined by rule 21 and extending vertically is a punch 32 having an upper end received in the ram 11 and a lower working end 34 terminating in the same horizontal plane as the rule edge 30. Male die 14 has an opening 35 to receive the punch, such opening flaring downwardly and outwardly through platen 12 and bed 10 to allow free discharge of each slug punched from a workpiece W resting on top of the male die.

On a downward working stroke of ram 11, rule 21 blanks a shaped piece 36 from workpiece W and at the same time the punch 32 forms a hole in the piece. Engagement of the rule with workpiece W forces the sheet metal downwardly around male die 14 as shown in FIG. 2. Pad 16 is compressed. The blanked piece becomes lodged on the end 34 of punch 32 and against the inside wall 31 of rule 21. When the ram elevates, pad 16 expands and returns the workpiece W to the same horizontal plane from which it started. The blanked piece 36 elevates with the ram and must be stripped from the punch and rule. For this purpose strippers 40 constructed according to this invention are provided.

As shown in FIG. 1, there are four strippers distributed about the area inside of rule 21 and surrounding punch 32. Each stripper comprises a metal retainer cup 41 which fits into a vertical opening 42 in wood 22 and provided with a relatively wide flange 44 engaging the bottom face 28 of the wood. Preferably, the wood surface within the rule 21 is faced with a metal sheet 45 which conforms in shape to rule 21 and has a periphery contiguous to the inside wall 31 of the rule. The axial length of each retainer cup is less than the thickness of block 22 whereby the upper end of each cup is slightly spaced from the bottom of ram 11, the space being shown at 46.

Each retainer cup 41 carries a compression coil spring 50, which when in normal expanded condition has a lower end 51 projecting below punch end 34 and rule edge 30, as shown in FIG. 3. On a blanking stroke of the ram 11, the springs 50 become compressed between workpiece W and retainer cups 41, as shown in FIG. 2. When the ram elevates, the springs expand and in so doing free the blanked piece 36. In FIG. 3, the freed piece is shown in dotted lines at the point where it leaves engagement of the springs 50. It is shown in solid lines after it has dropped downwardly onto the male die 14 where it can be picked up.

The compression of springs 50 produce no lateral forces against the inside wall 31 of rule 21. Therefore, the rule does not direct forces to the wood 22 tending to rupture it. Further, when the springs operate to strip the piece 36, the downward force produced is accompanied by an upward force against the cups 41. The flanges 44 on the cups provide an upward force against the face cover 45 of the wood helping to hold the wood against ram 11. The wood in turn securely holds the rule 21 to resist the forces tending to pull the rule downwardly with the workpiece 36 as it is stripped.

With this design, the female die will have a long operative life without breaking down. Rupturing of the wood 22 responsive to stripping forces is prevented. The relatively long compressing stroke of the spring 50 provides a strong stripping action, and the area occupied by the strippers is relatively small. Further, the deflection of the springs in relation to their overall length is smaller than provided heretofore.

As shown in FIG. 4, rubber blocks 55 may be used in the cups 41 instead of coil springs 50. The long length of the blocks enables the use of rubber having desirable deflection, wear and resilient characteristics.

The overall arrangement described is simply designed whereby a die set may be fabricated at a relatively low cost. Relegating the wood 22 to a supporting function for the rule 21 and protecting the wood against the substantial stripping forces provides a structure which will function for a long period without break down.

While this invention has been described in connection with two embodiments thereof, it will be understood that it is capable of modification, and this application is intended to cover any variations, uses, or adaptations, following, in general, the principles of the invention and including such departures from the present disclosure as come within known or customary practice in the art to which the invention pertains, and as fall within the scope of the invention or the limits of the appended claims.

Having thus described my invention, what I claim is:

1. A die structure for blanking shaped pieces from a sheet metal workpiece, comprising cooperative male and female dies, said male die being mountable on a bed and said female die on a ram reciprocal toward and away from said bed, said female die comprising a rule engaging said ram and extending therefrom toward said bed, a wood block within said rule and engaging the ram and the inside of the rule, said rule having a working end projecting below the surface of said wood and providing a space within the rule, said wood having an opening extending from said surface to said ram, a retainer cup in said opening and having an end adjacent said ram, said retainer cup having a laterally outwardly extending flange engaging the surface of said wood, a resilient stripper within said retainer cup and extending outwardly therefrom and beyond said surface of said wood, said stripper being compressed between the retainer cup and the workpiece on a working stroke of said ram to store energy as said rule blanks a workpiece, and the stripper expanding thereafter when the ram retracts to force the blanked piece from the rule.

2. A die structure for blanking shaped pieces from a sheet metal workpiece, comprising cooperative male and female dies, said male die being mountable on a bed and said female die on a ram reciprocal toward and away from said bed, said female die comprising a rule engaging said ram and extending therefrom toward said bed, a wood block within said rule and engaging the ram and the inside of the rule, said rule having a working end projecting below the surface of said wood and providing a space within the rule, said wood having an opening extending from said surface and toward the ram, a retainer cup in said opening and having a flange outside said opening engaging the surface of said wood, a resilient stripper in said retainer cup and extending outwardly and beyond said working end of said rule, said stripper being compressed on a working stroke of said ram to store energy as said rule blanks a workpiece and the stripper expanding thereafter when the ram retracts to force the blanked piece from the rule.

3. A die structure for blanking shaped pieces from a sheet metal workpiece as recited in claim 2 wherein said surface of said wood is provided with a hard sheet cover with which said flange of said cup is engageable.

4. A die structure for blanking shaped pieces from a sheet metal workpiece as recited in claim 3 wherein said cover conforms in shape to said rule and has edges contiguous to said inside of the rule.

5. A die structure for blanking shaped pieces from a sheet metal workpiece as recited in claim 2 wherein said opening in said wood extends to said ram, and the thickness of the wood being such relative to the depth of said cup that the end of the cup toward the ram is spaced from the ram.

6. A die structure for blanking shaped pieces from a sheet metal workpiece as recited in claim 2 wherein said wood has plural openings, along with a retainer cup and resilient stripper for each opening, said openings being spaced from each other and distributing the forces required to strip the blanked piece from the rule.

7. A die structure for blanking shaped pieces from a sheet metal workpiece as recited in claim 2 wherein said resilient stripper in said retainer cup comprises a coil compression spring.

8. A die structure for blanking shaped pieces from a sheet metal workpiece as recited in claim 2 wherein said resilient stripper in said retainer cup comprises a block of rubber.

References Cited by the Examiner

UNITED STATES PATENTS

| 1,108,104 | 4/14 | Nansinec | 83—143 |
| 2,850,096 | 9/58 | Berlin et al. | 83—123 |

FOREIGN PATENTS 210,552  10/60  Austria.

ANDREW R. JUHASZ, *Primary Examiner.*